US011583145B2

(12) United States Patent
Zhou et al.

(10) Patent No.: US 11,583,145 B2
(45) Date of Patent: Feb. 21, 2023

(54) MATERIAL, CLEANING DEVICE AND COOKING APPLIANCE

(71) Applicant: FOSHAN SHUNDE MIDEA ELECTRICAL HEATING APPLIANCES MANUFACTURING CO., LIMITED, Foshan (CN)

(72) Inventors: Zhongbao Zhou, Foshan (CN); Dianguo Pan, Foshan (CN); Baomin Yang, Foshan (CN); Xiaoli Liu, Foshan (CN); Ya Zhou, Foshan (CN); Pofeng Ho, Foshan (CN)

( * ) Notice: Subject to any disclaimer, the term of this patent is extended or adjusted under 35 U.S.C. 154(b) by 574 days.

(21) Appl. No.: 16/616,931

(22) PCT Filed: Aug. 21, 2017

(86) PCT No.: PCT/CN2017/098376
§ 371 (c)(1),
(2) Date: Nov. 25, 2019

(87) PCT Pub. No.: WO2019/010755
PCT Pub. Date: Jan. 17, 2019

(65) Prior Publication Data

US 2020/0253425 A1 Aug. 13, 2020

(30) Foreign Application Priority Data

Jul. 12, 2017 (CN) ......................... 201720842745.1

(51) Int. Cl.

| | |
|---|---|
| ***A47J 43/24*** | (2006.01) |
| ***A47J 27/08*** | (2006.01) |
| ***B02B 1/06*** | (2006.01) |

(52) U.S. Cl.
CPC ........... *A47J 43/24* (2013.01); *A47J 27/0802* (2013.01); *B02B 1/06* (2013.01)

(58) Field of Classification Search
CPC .......... A47J 43/24; A47J 27/0802; B02B 1/06
(Continued)

(56) References Cited

FOREIGN PATENT DOCUMENTS

| | | | |
|---|---|---|---|
| CN | 204931266 U | * | 1/2016 |
| CN | 206080100 U | | 4/2017 |

(Continued)

OTHER PUBLICATIONS

Translation of CN-204931266-U (Year: 2016).*
International Search Report dated Apr. 13, 2018 in the corresponding International Application No. PCT/CN2017/098376.

*Primary Examiner* — Brent T O'Hern
(74) *Attorney, Agent, or Firm* — Kilpatrick Townsend & Stockton, LLP

(57) ABSTRACT

The present disclosure provides a material cleaning device and a cooking appliance: The device includes a cleaning cavity, a material transport pipe, a cleaning inlet pipe and a cleaning and sealing assembly. The upper part of the cleaning cavity is provided with a material feeding port and an air inlet; the air inlet is used for transporting an air flow to the cleaning cavity to assist in material discharging; the cleaning inlet pipe is able to be connected to a water source and an air source, the cleaning and sealing assembly is provided at a material discharging port and is connected to the cleaning inlet pipe so as to open or close the material discharging port under the driving of the cleaning inlet pipe; and the cleaning and sealing assembly is provided with a transport hole in communication with an output end of the cleaning inlet pipe and the inner space of the cleaning cavity.

13 Claims, 4 Drawing Sheets

(58) Field of Classification Search
USPC .......................................................... 99/536
See application file for complete search history.

(56) References Cited

FOREIGN PATENT DOCUMENTS

| | | | |
|---|---|---|---|
| CN | 206166760 | U | 5/2017 |
| CN | 206213804 | U | 6/2017 |
| CN | 206252417 | U | 6/2017 |
| CN | 206284898 | U | 6/2017 |
| JP | 2002273240 | A | 9/2002 |
| JP | 2004358342 | A | 12/2004 |

* cited by examiner

MATERIAL, CLEANING DEVICE AND COOKING APPLIANCE

CROSS-REFERENCES TO RELATED APPLICATIONS

The present disclosure is a national phase application of International Application No. PCT/CN2017/098376, filed on Aug. 21, 2017, which claims the priority of Chinese Application No. 201720842745.1, filed in the Chinese Patent Office on Jul. 12, 2017, the entireties of which are herein incorporated by reference.

FIELD

The present disclosure relates to the field of kitchen appliances, and particularly relates to a material cleaning device and a cooking appliance comprising the same.

BACKGROUND

At present, an intelligent cooking appliance such as an automatic rice cooker has the function of automatically cleaning materials, the materials enter an upper cover rice cleaning box through a material feeding port with the wind power, an air flow is fed through the material feeding port after the materials are cleaned, and are then fed into an inner pot through the air flow. Due to the fact that the material feeding port is used for feeding and incoming of air, the air supply component and the feeding component need to be provided together, and the overall layout requirement of the product is high.

SUMMARY

Embodiments of the present disclosure provide a material cleaning device.

It is another object of the present disclosure to provide a cooking appliance including the above material cleaning device.

Embodiments of the present disclosure provide a material cleaning device for a cooking appliance, which comprises: a cleaning cavity, wherein the upper part of the cleaning cavity is provided with a material feeding port and an air inlet, the bottom of the cleaning cavity is provided with a material discharging port, and the air inlet is used for transporting air flow to the cleaning cavity to assist material discharging; a material transport pipe communicated with the material feeding port and used for transporting materials to be cleaned to the cleaning cavity; a cleaning inlet pipe, wherein the input end of the cleaning inlet pipe is able to be connected to a water source and an air source, and the output end of the cleaning inlet pipe extends into the cleaning cavity and is able to move up and down relative to the cleaning cavity; and a cleaning and sealing assembly provided at the material discharging port and connected to the output end of the cleaning inlet pipe to open or close the material discharging port under the driving of the cleaning inlet pipe, and the cleaning and sealing assembly is provided with a transport hole communicated with the output end of the cleaning inlet pipe and the inner space of the cleaning cavity.

According to embodiments of the present disclosure, the cleaning cavity is provided with a material feeding port, an air inlet and a material discharging port; the material feeding port is connected to a material transport pipe, so that materials are able to be automatically fed into the cleaning cavity, and automatic feeding is realized; the air inlet is able to be connected to an air source (such as an air pump, a fan and the like), so that materials are able to be discharged from the material discharging port with the air flow and gravity, and automatic material discharging is realized; a cleaning and sealing assembly is provided at the material discharging port, the cleaning and sealing assembly is communicated with a cleaning inlet pipe, the cleaning inlet pipe is connected to an air source and a water source through a three-way joint to transport air flow and water flow to a cleaning cavity; the water flow is used for cleaning materials, the air flow is used for promoting the materials and the water to roll, rub, rotate and the like, so that the cleaning of the materials is realized, namely the effect of blowing air to clean rice is realized by utilizing air flow stirring, and the air flow stirring is compared with mechanical stirring; the structure is simpler, and cleaning is more sanitary; the cleaning and sealing assembly also has the function of a discharge valve to open or close the material discharging port, so that the integration level of the product is improved, the volume of the product is reduced, and the structure of the product is simplified; in addition, the material feeding port and the air inlet are separated from each other as compared with the scheme of combining them into one, on the basis that the pneumatic material discharging function is achieved, the selection range of the material feeding power sources (for example: besides pneumatic feeding, automatic feeding can be realized by gravity, water power or other external force) is increased, and the position selection range of the air source connected to the air inlet (for example: taking the electric rice cooker as an example, the electric rice cooker can be positioned not only in the cooker body but also in the cooker cover) is also expanded, to facilitate reasonable design according to the specific structures and market positioning of different products, to further optimize the performance and structure of the cooking appliance.

According to one embodiment, the cleaning and sealing assembly comprises: a housing matched with the shape of the material discharging port, and the housing is provided with the transport hole; a joint installed at the top of the housing and connected to the output end of the cleaning inlet pipe and communicated with the cleaning inlet pipe and the inner space of the housing.

The cleaning and sealing assembly comprises a housing and a joint, and the housing is matched with the shape of the material discharging port, so that the material discharging port can be opened or closed, and the sealing function is realized; the joint is provided at the top of the housing and connected to the output end (such as a threaded connection) of the cleaning inlet pipe, and is communicated with the inner space of the housing and the cleaning inlet pipe, so that the cleaning inlet pipe is able to supply water and air for the cleaning and sealing assembly; a transport hole is formed in the housing, so that the cleaning and sealing assembly is able to transport water flow and air flow to the cleaning cavity. Further, the joint may also form an integral structure with the housing, provided that the joint is capable of supplying water and air to the interior of the housing.

According to one embodiment, the cleaning and sealing assembly further comprises: a spray head installed at the bottom of the housing and provided opposite to the joint, wherein the water spraying port of the spray head is communicated with the cooking chamber of the cooking appliance, and the spray head is able to move relative to the joint; wherein when the cleaning inlet pipe moves up and down, the housing is able to be driven to move up and down, and at the same time the joint and the spray head are driven to move relatively, so that when the housing closes the material discharging port, the spray head is isolated from the joint, and when the housing opens the material discharging port, the spray head is communicated with the joint.

The cleaning and sealing assembly further comprises a spray head installed at the bottom of the housing and provided opposite to the joint, and a water spraying port of the spray head is communicated with the cooking chamber, so that atomized mist is able to be sprayed to the cooking chamber, and the spray head plays a role of preventing overflowing and breaking bubbles in the cooking process. Therefore, on the basis of having a sealing function, an air supply function and a water supply function, the cleaning and sealing assembly also has an anti-overflow function, so that the integration level of the cleaning and sealing assembly is improved, and the product structure is simplified.

In one embodiment, when the spray head and the joint move relative to each other to be communicated with the joint, atomized mist is able to be sprayed into the cooking chamber to prevent overflowing and bubble breaking, the overflow prevention function is realized, at the moment, the housing just opens the material discharging port, and the spray head is able to spray atomized mist more uniformly, so that the overflow prevention and bubble breaking effect is better; when the spray head and the joint move relative to each other to be isolated from the joint, the spray head is closed (the spray head is in a closed state when the spray head is isolated from the joint due to the fact that the water flow is required to have certain pressure to enter and be sprayed out by the spray head), the housing closes the material discharging port, the material cleaning device is able to perform a cleaning process, and the spray head is closed to avoid water loss or air loss caused by water leakage at the spray head; the normal operation of the cleaning process is guaranteed.

Specific to the relative movement of the joint and the spray head, the spray head can be fixed on the housing, the joint is movably installed on the housing, and the relative movement of the joint and the spray head is realized through the movement of the joint relative to the housing; the joint can also be fixed on the housing, the spray head is movably installed on the housing, and the relative movement between the spray head and the joint is realized through the movement of the spray head relative to the housing; of course, it is also possible that both the spray head and the joint are movably installed on the housing, relative movement of the spray head and the joint is achieved by movement of the housing relative to each other.

According to one embodiment, the cleaning and sealing assembly further comprises: an elastic member positioned in the housing and used for enabling the joint to be communicated with the spray head when the housing opens the material discharging port.

The elastic member is provided in the housing, when the housing closes the material discharging port, the elastic member elastically deforms to store elastic potential energy, and at the moment, the cleaning inlet pipe and the cleaning cavity respectively exert acting force on the joint and the housing, so that the joint and the spray head is able to be separated to close the spray head; when the housing opens the material discharging port, the acting force exerted by the cleaning cavity on the housing disappears, the elastic member releases elastic potential energy to restore deformation, so that the joint abuts against the spray head, the joint is communicated with the spray head, the spray head is opened, meanwhile, the joint is disconnected from the interior of the cleaning cavity, water output by the cleaning inlet pipe enters the cooking cavity through the spray head in the form of atomized mist, and bubble breaking and overflow prevention are carried out. Therefore, the automatic opening of the spray head is realized by arranging the elastic member in the housing, sealing and anti-overflow functions are achieved, the structure of the product is simplified, and the design is ingenious. In one embodiment, the elastic member is a spring which is good in elasticity, large in deformation and low in cost.

Of course, the elastic member can be other elastic structures such as elastic sheets and the like, and is not listed again here; the elastic member is not provided in the housing, but the relative movement of the joint and the spray head can be realized through other structures, so that the connection or disconnection of the joint and the spray head is able to be realized. For example, an elastic member is provided below the cleaning cavity and connected to the spray head, and when the cleaning inlet pipe moves upwards to seal the material discharging port, the elastic member stretches and deforms to separate the spray head from the joint; when the cleaning inlet pipe moves downwards to open the material discharging port, the elastic member recovers deformation or undergoes compression deformation, so that the joint is communicated with the spray head; or other schemes, which are not In one embodiment enumerated herein, are intended to be within the scope of the present disclosure since they are capable of attaining the objects of the present disclosure without departing from the spirit and scope of the present disclosure.

According to one embodiment, the joint is movably installed on the housing, the lower end of the joint is provided with a limiting boss, the spray head is fixedly installed on the housing, the elastic member is sleeved on the joint, and the upper end and the lower end of the elastic member respectively abut against the housing and the limiting boss and are in a compressed state; when the cleaning inlet pipe moves upwards, the housing closes the material discharging port; and when the cleaning inlet pipe moves downwards, the housing opens the material discharging port.

The joint is movably provided on the housing, so that the joint is able to move relative to the housing, and relative movement between the joint and the spray head is able to be guaranteed; the lower end of the joint is provided with a limiting boss, so that the joint is able to not fall out of the housing; the elastic member is sleeved on the joint, and the upper end and the lower end of the elastic member respectively abut against the housing and the limiting boss, so that the elastic member is able to not fall off, the deformation direction of the elastic member is consistent with the movement direction of the joint, and the use reliability of the elastic member is improved; the elastic member is in a compressed state, so that when the housing opens the material discharging port, the elastic member is able to exert downward acting force on the joint, and because the spray head is fixedly installed on the housing, the elastic member is able to tightly abut against the joint on the spray head to realize communication between the spray head and the joint; when the cleaning inlet pipe moves upwards, the housing closes the material discharging port, so that the cleaning cavity and the cleaning inlet pipe is able to respectively exert downward and upward acting forces on the housing and the joint, the housing and the joint is able to exert extrusion acting forces on the elastic member, the elastic member is further compressed and deformed, meanwhile, the joint is separated from the spray head, the spray head is closed, and the cleaning cavity is communicated; when the cleaning inlet pipe moves downwards, the housing opens the material discharging port, so that the acting force exerted by the cleaning cavity on the housing disappears, the elastic member recovers deformation and presses the housing upwards, the housing drives the spray head to move upwards relative to the joint, and the joint tightly abuts against the spray head to open the spray head and communicate with the cooking cavity.

According to one embodiment, the housing comprises: an upper cover, wherein the joint is provided on the upper cover on which the transport hole is provided; a bottom cover connected to the lower end of the upper cover, wherein the spray head is installed on the bottom cover and penetrates through the bottom cover; the shape of the upper cover and/or the bottom cover is adapted to the material discharging port.

The housing comprises an upper cover and a bottom cover, the joint and the spray head are respectively provided on the upper cover and the bottom cover, the upper cover is provided with a transport hole, and the transport hole is located at the upper part of the housing to ensure that the transport hole is located inside the cleaning cavity and is communicated with the inner space of the cleaning cavity; the spray head penetrates through the bottom cover, so that a water spraying port of the spray head is able to be communicated with the cooking chamber, and atomized mist is sprayed into the cooking chamber; the housing is composed of two parts, so that the joint, the elastic member and the spray head are convenient to maintain and assemble and disassemble; and the shapes of the upper cover or the bottom cover or the upper cover and the bottom cover are matched with the material discharging port, so that the housing is able to effectively seal the material discharging port.

According to one embodiment, the upper cover comprises: a top cover installed with the joint, wherein the lower end face of the top cover is provided with a first annular plate sleeved outside the joint and has a gap with the joint and is connected to the bottom cover, and the first annular plate is provided with a communication hole; and a sealing cover sleeved outside of the first annular plate and positioned between the lower end face of the top cover and the upper end face of the bottom cover and matched with the shape of the material discharging port, wherein the sealing cover is an elastomer, the sealing cover is provided with the transport hole, and the transport hole is communicated with the communication hole.

The upper cover comprises a top cover and a sealing cover, the joint is provided on the top cover, and the cleaning and sealing assembly is connected to the cleaning inlet pipe; the lower end face of the top cover is provided with a first annular plate, the first annular plate is sleeved outside the joint, a gap is formed between the first annular plate and the joint, a communication hole is formed in the first annular plate, and when the joint is isolated from the spray head, an internal channel of the joint is communicated with the communication hole through the gap between the first annular plate and the joint; the sealing cover is sleeved on the outside of the first annular plate and positioned between the lower end face of the top cover and the upper end face of the bottom cover, and the sealing cover is an elastomer, so that the lower end face of the top cover and the upper end face of the bottom cover is able to exert a vertical squeezing force and a certain horizontal static friction force on the sealing cover to limit the vertical movement and the horizontal movement of the sealing cover, and the first annular plate ensures that the sealing cover does not horizontally fall out, so that integrity of the housing is guaranteed; meanwhile, the sealing cover is matched with the shape of the material discharging port, namely the material discharging port is enclosed by the sealing cover, due to the fact that the sealing cover is an elastomer, certain elastic deformation is able to occur when the material discharging port is enclosed by the sealing cover, the sealing cover is tightly attached to the material discharging port, an effective sealing effect is achieved, sealing members such as sealing rings and the like do not need to be provided between the housing and the material discharging port to improve the sealing performance of the material discharging port, and therefore the structure of the material cleaning device is simplified; in addition, compared with the rigid body, the processing and molding of the elastomer are easier, so that the transport holes are formed in the sealing cover, and the processing technology of the product is simplified; and the transport hole is communicated with the communication hole, so that when the joint is isolated from the spray head, the air flow and the water flow output by the joint enter the transport hole through the communication hole and then are transported into the cleaning cavity.

In one embodiment, the sealing cover is a silica gel cover, and the silica gel not only has certain rigidity so that the sealing cover is able to keep a fixed shape, but also has certain elasticity so that the sealing cover is able to generate a proper amount of elastic deformation to meet the assembly requirement and the sealing requirement.

According to one embodiment, the upper end face of the bottom cover is provided with a second annular plate, the second annular plate is connected to the first annular plate, and the bottom cover is connected to the top cover; wherein a third annular plate is provided in the sealing cover, the third annular plate is sleeved outside the second annular plate and is attached to the outer surface of the second annular plate, and the transport hole is positioned above the third annular plate.

The upper end face of the bottom cover is provided with a second annular plate, and the second annular plate is connected to the first annular plate (such as threaded connection, clamping connection and the like), so that the bottom cover and the top cover are fixedly connected; a third annular plate is provided in the sealing cover, the third annular plate is sleeved outside the second annular plate and is attached to the outer surface of the second annular plate, so that the second annular plate effectively limits the sealing cover, the sealing cover is prevented from moving in the radial direction, the upper limit and the lower limit are carried out on the lower end surface of the top cover and the upper end surface of the bottom cover, and the second annular plate horizontally limits the sealing cover (when the housing is circular, static friction force exerted by the top cover, the bottom cover and the second annular plate on the sealing cover is also able to limit the circumferential rotation of the sealing cover), so that the use reliability of the sealing cover is guaranteed; and the transport hole is positioned above the third annular plate, so that the third annular plate is prevented from shielding the transport hole, and the communication between the transport hole and the communication hole is further ensured.

According to one embodiment, a limiting surface is further provided in the sealing cover, and the upper end surface of the second annular plate abuts against the limiting surface.

Due to the fact that the limiting surface is provided in the sealing cover, the upper end surface of the second annular plate abuts against the limiting surface, the limiting surface is able to be tightly attached to the upper end surface of the second annular plate (since the sealing cover is an elastic body), thus a good sealing effect is achieved, so that water flow or air flow output by the circulation hole is able to be prevented from leaking out between the second annular plate and the third annular plate, and the sealing property inside the cleaning and sealing assembly is effectively improved. Furthermore, the second annular plate and the third annular plate can be designed to be in clearance fit to facilitate assembling and disassembling; meanwhile, the second annular plate and the sealing cover are mutually limited, and the stability of the housing is further improved.

According to any technical scheme, the material cleaning device further comprises: a sealing member installed on the bottom cover and sleeved at the inlet of the spray head.

When the sealing member is provided at the inlet of the spray head, the joint and the spray head is able to be tightly pressed on the sealing member when the joint and the spray head are communicated in pairs, so that the sealing property between the spray head and the joint is improved when the spray head and the joint are communicated, the water flow is ensured to enter the spray head with enough pressure, and the spray bubble breaking efficiency of the spray head is improved. In one embodiment, the sealing member is a sealing rubber gasket.

In any technical scheme, there are multiple transport holes, and the transport holes are uniformly distributed along the circumferential direction of the housing; and/or the transport holes are formed in the upper part of the housing, and the cross sectional area of the upper part of the housing gradually becomes larger from top to bottom; and/or the upper part of the housing is a rotating body, and the cross sectional area of the rotating body gradually changes from top to bottom, the transport holes are formed in the rotating body, the transport holes are in a strip shape integrally and rotating along the wall surface of the rotating body and extend obliquely.

There are multiple transport holes, so that the efficiency of transporting airflow and water flow for cleaning the sealing assembly is improved; transport holes are uniformly distributed along the circumferential direction of the housing, on one hand, the uniformity of airflow output is improved, and materials in the cleaning cavity are able to be uniformly stirred, so that the cleaning efficiency is improved; on the other hand, the integral stress of the housing is balanced, and the stability of the cleaning and sealing assembly is improved.

The transport hole is provided at the upper part of the housing, so that effective communication between the transport hole and the cleaning cavity is guaranteed; the cross sectional area of the upper part of the housing is gradually increased from top to bottom, and the transport holes are inclined upwards, so that the airflow is able to be obliquely sprayed upwards, the tumbling of materials and water is facilitated, the pneumatic stirring efficiency is improved, and the cleaning efficiency is improved.

The upper part of the housing is a rotating body, and the cross-sectional area of the rotating body gradually changes from top to bottom, the upper part of the housing is integrally conical or bowl-shaped, the transport holes are provided at the rotating body and are integrally elongated, and the transport holes extend obliquely along the wall surface of the rotating body in a rotating mode, so that on one hand, water flow and air flow is able to be sprayed out in a rotating mode. Although the transport holes are separated from each other, the air flows transported by the different transport holes are able to be integrated, the coverage range is wider, materials in a circumferential range are able to be stirred by using a limited number of transporting holes, no dead angle of 360° is able to be realized, and therefore the cleaning efficiency is improved; on the other hand, when the airflow is sprayed out, the airflow also has a certain horizontal component speed, so that materials and water are able to be driven to rotate, and the cleaning efficiency is also improved; in addition, the size of the transport holes is able to be remarkably increased, so that the air transporting efficiency and the water transporting efficiency are improved, and the number of the transport holes is reduced (for example, possibly only one row of transport holes is required to meet the requirement); meanwhile, the appearance is more attractive. Furthermore, the upper cover comprises the top cover and the sealing cover, the transport hole is provided at the sealing cover and extends upwards to penetrate through the upper end face of the sealing cover.

According to any technical scheme, the material cleaning device further comprises: a driving device comprising a driving member and a transmission assembly connected to the driving member, and the transmission assembly is connected to the cleaning inlet pipe to drive the cleaning inlet pipe to move up and down, and the cleaning inlet pipe drives the cleaning and sealing assembly to move up and down.

According to one embodiment, the material cleaning device further comprises: a limiting member matched with the transmission assembly and used for limiting the movement amplitude of the transmission assembly.

According to one embodiment, the transmission assembly comprises: a gear connected to the output shaft of the driving member; and a rack slider meshed with the gear and connected to the cleaning inlet pipe and extending in the vertical direction to drive the cleaning inlet pipe to move up and down; and the limiting member is positioned above the rack slider to limit the amplitude of upward movement of the rack slider.

The cleaning inlet pipe is driven to move up and down by the driving device, so that the automation degree of products is further improved; when the driving device drives the cleaning inlet pipe to move up and down, the cleaning inlet pipe drives the cleaning and sealing assembly to move up and down, and then the material discharging port is opened or closed; and the limiting member is matched with the transmission assembly, so that the cleaning inlet pipe is able to be prevented from excessively moving up and down to damage the product structure or other adverse effects (such as excessive upward movement of the cleaning inlet pipe results in frictional wear and even deformation of the cleaning and sealing assembly and the cleaning cavity).

In one embodiment, the driving device comprises a driving member and a transmission assembly, and the transmission assembly comprises a gear and a rack slider, the gear is connected to an output shaft of the driving member (such as a motor) and rotates along with the rotation of the motor shaft, the rack slider is meshed with the gear and extends in the vertical direction, and when the gear rotates, the rack slider is driven to move up and down in the vertical direction, so that the cleaning inlet pipe moves up and down; and the limiting member is positioned above the rack slider, so that the upward movement amplitude of the rack slider is able to be limited, and the situation that excessive upward movement of the cleaning inlet pipe results in frictional wear and even deformation of the cleaning and sealing assembly and the cleaning cavity is avoided. Of course, the drive assembly is not limited to a gear-rack-slider configuration but other forms, which will not be enumerated here.

One embodiment of the present disclosure provides a cooking appliance, comprising: a cooking body having a cooking chamber; and the material cleaning device of any of the first aspect technical scheme, and a material discharging port of the cleaning cavity communicates with the cooking chamber for cleaning the material fed into the cleaning cavity and feeding the cleaned material into the cooking chamber.

The cooking appliance provided by one embodiment of the present disclosure has all the beneficial effects of any of the above technical schemes due to the inclusion of the material cleaning device as described in any embodiment, and will not be described in detail herein.

According to one embodiment, the cooking body comprises: a pot body and a cover body, and the cover body is covered with the pot body to enclose the cooking chamber; and the material cleaning device is provided on the cover body.

The material cleaning device is provided on the cover body and is convenient to communicate with the cooking chamber when the material discharging port of the cleaning cavity is opened, so that materials in the cleaning cavity is able to smoothly enter the cooking chamber for cooking, and the structure is more compact and reasonable.

In one embodiment, the cleaning cavity of the material cleaning device and the cover body of the cooking appliance are all integrated structures, so that the assembling efficiency of the product is able to be improved, the assembling matching precision and the sealing connection reliability of the air inlet pipeline, the air outlet pipeline, the water inlet pipeline, the sewage pipeline and the cleaning cavity are able to be further guaranteed, and the using reliability of the product is able to be guaranteed.

In any of the above technical schemes, the cooking appliance is an electric cooker.

Of course, it is not limited to an electric cooker, but may also be an electric pressure cooker, an electric stewpot, an electric steamer, etc.

BRIEF DESCRIPTION OF THE DRAWINGS

Embodiments of the present disclosure will be apparent from and elucidated with reference to the accompanying drawings, in which.

Figure 1:
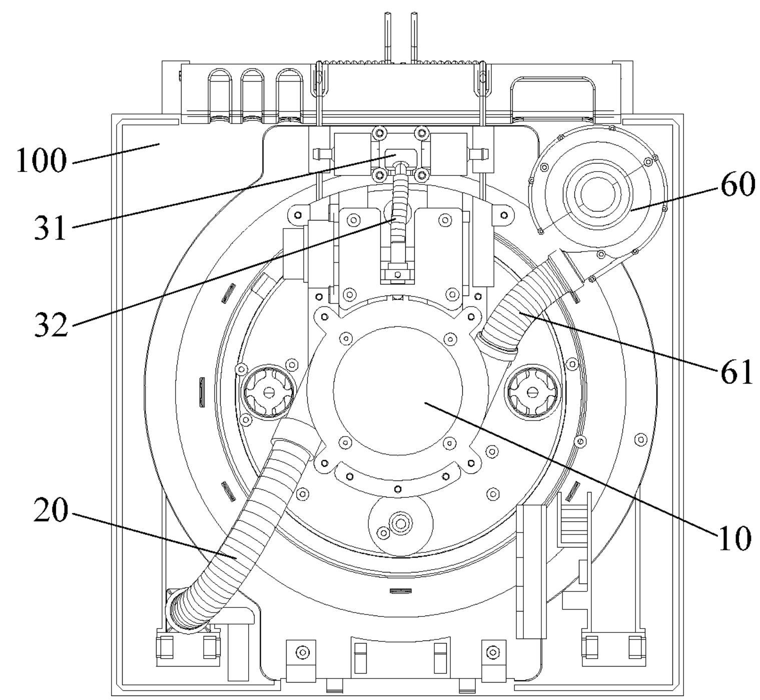
FIG. 1 is a schematic partial top view of a cooking appliance according to some embodiments of the present disclosure.
Figure 3:
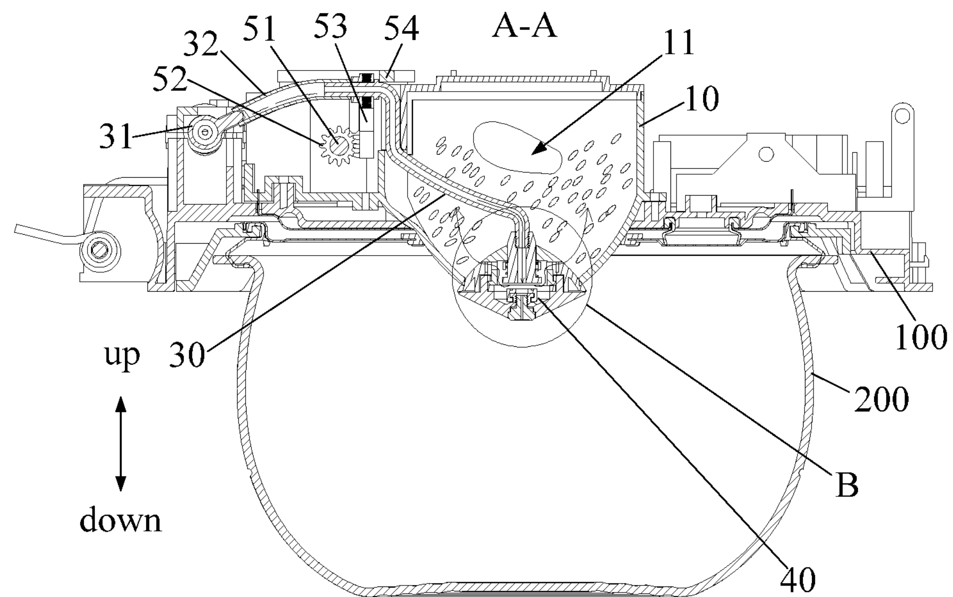
FIG. 3 is a schematic cross-sectional view in the first state taken from A-A of FIG. 2.
Figure 4:
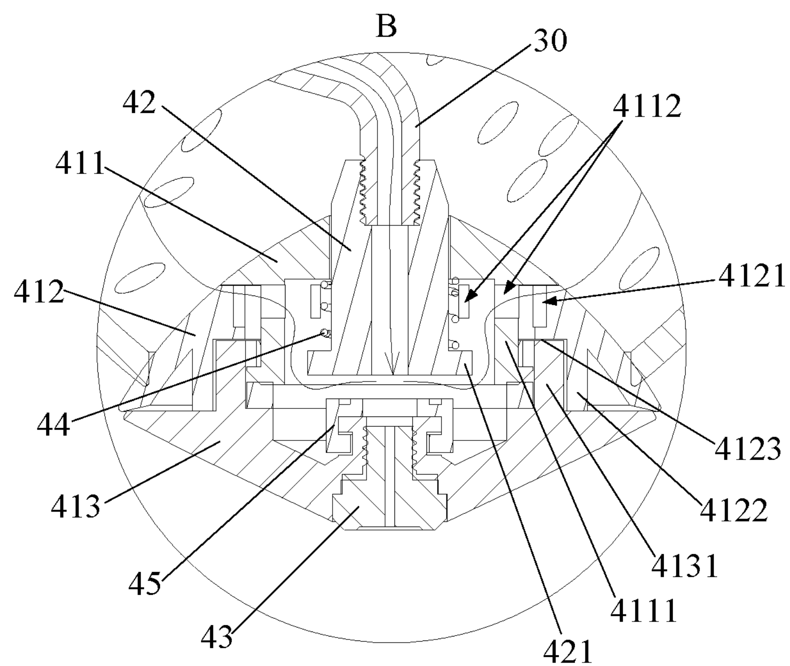
FIG. 4 is an enlarged schematic view of part B of FIG. 3.
Figure 5:
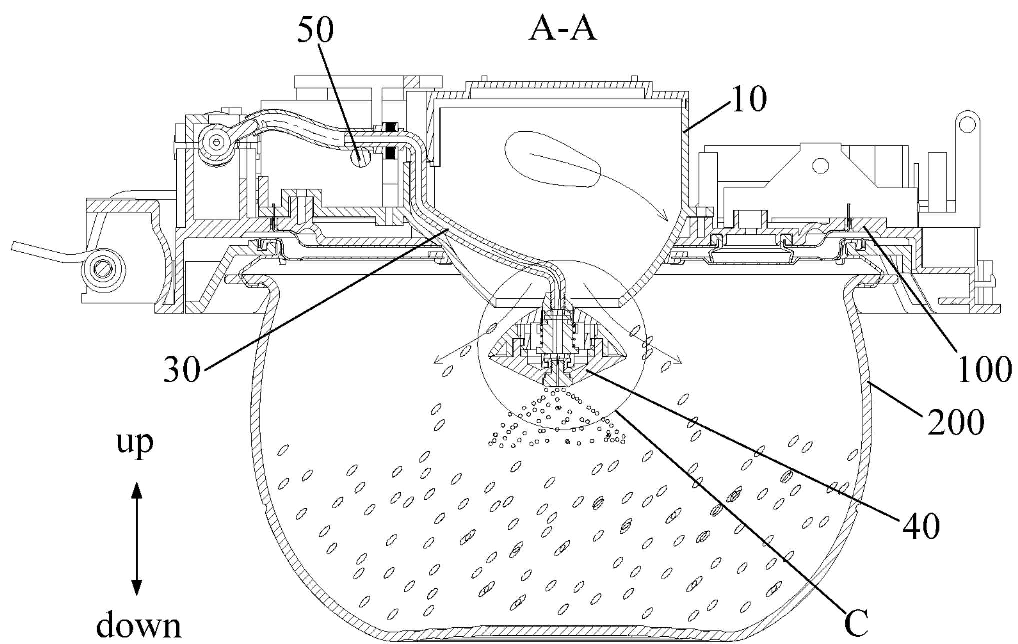
FIG. 5 is a schematic cross-sectional view in the second state A-A taken from FIG. 2.
Figure 6:
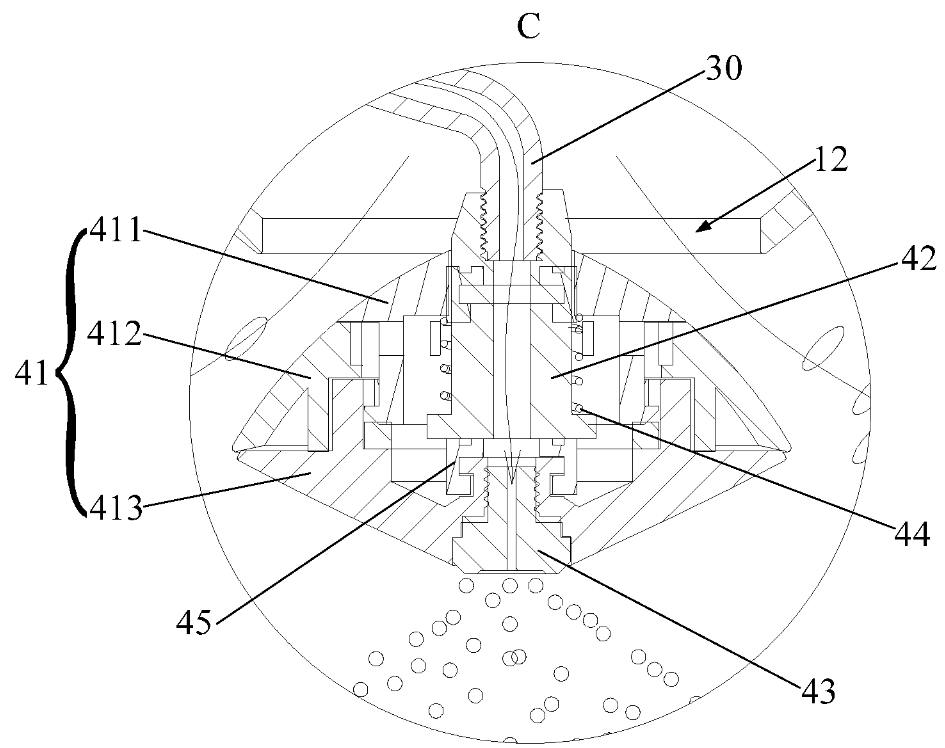
FIG. 6 is an enlarged schematic view of part C of FIG. 5.

The correspondence between the reference numerals and the component names in FIGS. 1 to 7 is as follows:

10 cleaning cavity, 11 air inlet, 12 material discharging port, 20 material transport pipe, 30 cleaning inlet pipe, 31 three-way joint, 32 connecting hose, 40 cleaning and sealing assembly, 41 housing, 411 top cover, 4111 first annular plate, 4112 communication hole, 412 sealing cover, 4121 transport hole, 4122 third annular plate, 4123 limiting surface, 413 bottom cover, 4131 second annular plate, 42 joint, 421 limiting boss, 43 spray head, 44 spring, 45 sealing rubber gasket, 50 driving device, 51 motor, 52 gear, 53 rack slider, 54 limiting member, 60 fan, 61 air inlet pipe, 100 cover body, 200 pot body;

The curved arrows in FIGS. 3 and 4 indicate the jet direction of the air or water stream;

The curved arrows in FIGS. 5 and 6 indicate the direction of flow of the air or material.

DETAILED DESCRIPTION

In the following description, numerous specific details are set forth in order to provide a thorough understanding of the present disclosure. However, the present disclosure may be practiced otherwise than as described herein, and therefore the scope of the present disclosure is not limited to the embodiments disclosed below.

A material cleaning device and a cooking appliance according to some embodiments of the present disclosure will now be described with reference to FIGS. 1 to 7.

As shown in FIGS. 1 to 6, an embodiment of the present disclosure provides a material cleaning device for a cooking appliance, comprising: a cleaning cavity 10, a material transport pipe 20, the cleaning inlet pipe 30 and a cleaning and sealing assembly 40.

In one embodiment, the upper part of the cleaning cavity 10 is provided with a material feeding port and an air inlet 11, the bottom of the cleaning cavity 10 is provided with a material discharging port 12, and the air inlet 11 is used for transporting air flow to the cleaning cavity 10 to assist material discharging; the material transport pipe 20 is communicated with the material feeding port and used for transporting materials to be cleaned to the cleaning cavity 10; an input end of the cleaning inlet pipe 30 is able to be connected to a water source and an air source, and an output end of the cleaning inlet pipe 30 extends into the cleaning cavity 10 and is able to move up and down relative to the cleaning cavity 10; and the cleaning and sealing assembly 40 is provided at the material discharging port 12 and is connected to the output end of the cleaning inlet pipe 30 to open or close the material discharging port 12 under the driving of the cleaning inlet pipe 30, and is provided with a transport hole 4121 communicated with the output end of the cleaning inlet pipe 30 and the inner space of the cleaning cavity 10.

Figure 2:
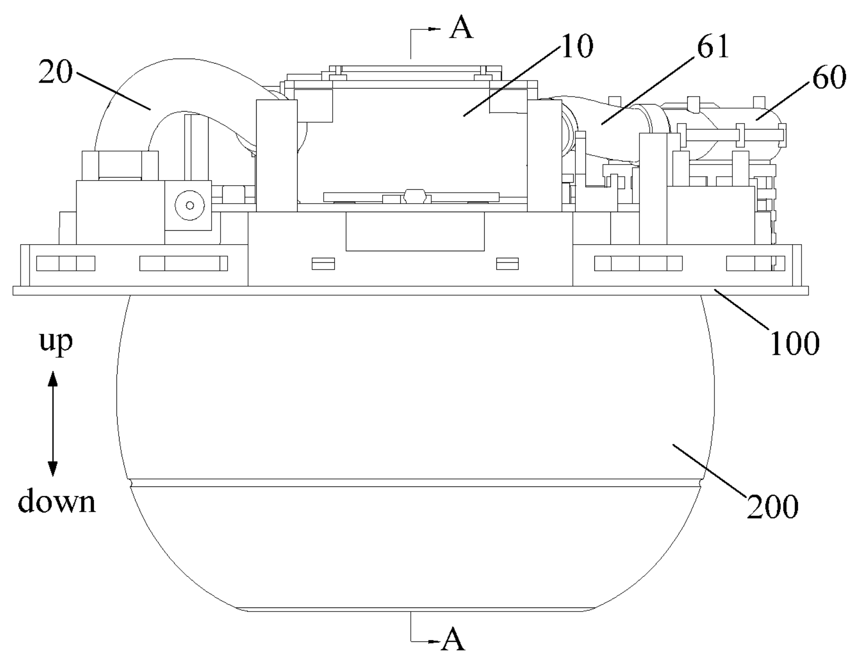
FIG. 2 is a schematic view showing a front view structure of the cooking appliance shown in FIG. 1.

According to the material cleaning device provided by the embodiment of the present disclosure, the cleaning cavity 10 is provided with a material feeding port, an air inlet 11 and a material discharging port 12, the material feeding port is connected to a material transport pipe 20, and as shown in FIGS. 1, 2, 3 and 5, the material is able to be automatically fed into the cleaning cavity 10 to realize automatic feeding; the air inlet 11 is connected to an air source (such as an air pump, a cover body fan 60 and the like) through an air inlet pipe 61, and as shown in FIGS. 1 and 2, materials are able to be discharged from the material discharging port 12 with the air flow and gravity, so that automatic material discharging is realized; a cleaning and sealing assembly 40 is provided at the material discharging port 12, the cleaning and sealing assembly 40 is communicated with the cleaning inlet pipe 30, and the cleaning inlet pipe 30 is connected to an air source and a water source through a three-way joint 31, as shown in FIGS. 1, 3 and 5, to transport an air flow and a water flow to the cleaning cavity 10, and the water flow is used for cleaning materials, and the air flow is used for promoting the materials and the water to roll, rub, rotate and the like to clean the materials; air flow stirring is utilized to realize the effect of cleaning rice by blowing, and compared with mechanical stirring, the air flow stirring is simpler in structure and more sanitary in cleaning; and the cleaning and sealing assembly 40 also has the function of a discharge valve to open or close the material discharging port 12, so that the product integration level is improved, the product volume is reduced, and the product structure is simplified; in addition, the material feeding port and the air inlet 11 are separately provided, as shown in FIGS. 1 and 2, compared with the embodiment combining the material feeding port and the air inlet 11 into one, on the basis of meeting the pneumatic material discharging function, the selection range of the material feeding power source is increased (for example: besides pneumatic feeding, automatic feeding can be realized by gravity, water power or other external force), and the position selection range of the air source connected to the air inlet 11 is expanded (for example: taking the electric rice cooker as an example, the electric rice cooker can be positioned not only in the cooker body but also in the cooker cover), so that the electric rice cooker can be reasonably designed according to specific structures and market positioning of different products, and the performance and the structure of the cooking appliance are able to be further optimized.

Further, as shown in FIGS. 4 and 6, the cleaning and sealing assembly 40 comprises: a housing 41 and a joint 42, and the housing 41 is matched with the shape of the material discharging port 12, the housing 41 is provided with the transport hole 4121; a joint 42 is installed at the top of the housing 41 and connected to the output end of the cleaning inlet pipe 30 and communicated with the cleaning inlet pipe 30 and the inner space of the housing 41.

The cleaning and sealing assembly 40 comprises a housing 41 and a joint 42, and the housing 41 is matched with the shape of the material discharging port 12, as shown in FIG. 4, so that the material discharging port 12 is able to be opened or closed, and the sealing function is realized; the joint 42 is provided at the top of the housing 41 and connected to the output end (such as a threaded connection) of the cleaning inlet pipe 30, and is communicated with the inner space of the housing 41 and the cleaning inlet pipe 30, so that the cleaning inlet pipe 30 is able to supply water and air for the cleaning and sealing assembly 40; a transport hole 4121 is formed in the housing 41, so that the cleaning and sealing assembly 40 is able to transport water flow and air flow to the cleaning cavity 10. Further, the joint may also form an integral structure with the housing, provided that the joint is capable of supplying water and air to the interior of the housing.

According to one embodiment, the cleaning and sealing assembly 40 further comprises: a spray head 43, as shown in FIGS. 4 and 6, installed at the bottom of the housing 41 and provided opposite to the joint, and the water spraying port of the spray head 43 is communicated with the cooking chamber of the cooking appliance, and the spray head 43 is able to move relative to the joint 42; and when the cleaning inlet pipe 30 moves up and down, the housing 41 is able to be driven to move up and down, and at the same time the joint 42 and the spray head 43 are driven to move relatively, so that when the housing 41 closes the material discharging port 12, the spray head 43 is isolated from the joint 42, and when the housing 41 opens the material discharging port 12, the spray head 43 is communicated with the joint 42.

The cleaning and sealing assembly 40 further comprises a spray head 43 installed at the bottom of the housing 41 and provided opposite to the joint 42, and a water spraying port of the spray head 43 is communicated with the cooking chamber, so that atomized mist is able to be sprayed to the cooking chamber, and the spray head 43 plays a role of preventing overflowing and breaking bubbles in the cooking process. Therefore, on the basis of having a sealing function, an air supply function and a water supply function, the cleaning and sealing assembly 40 also has an anti-overflow function, so that the integration level of the cleaning and sealing assembly 40 is improved, and the product structure is simplified.

In one embodiment, when the spray head 43 and the joint 42 move relative to each other to be communicated with the joint 42, atomized mist is able to be sprayed into the cooking chamber to prevent overflowing and bubble breaking, the overflow prevention function is realized, as shown in FIGS. 5 and 6, at the moment, the housing 41 just opens the material discharging port 12, and the spray head 43 is able to spray atomized mist more uniformly, so that the overflow prevention and bubble breaking effect is better; when the spray head 43 and the joint 42 move relative to each other to be isolated from the joint 42, the spray head 43 is closed (the spray head 43 is in a closed state when the spray head 43 is isolated from the joint 42 due to the fact that the water flow is required to have certain pressure to enter and be sprayed out by the spray head 43), the housing 41 closes the material discharging port 12, the material cleaning device is able to perform a cleaning process, as shown in FIGS. 3 and 4, and the spray head 43 is closed to avoid water loss or air loss caused by water leakage at the spray head 43; the normal operation of the cleaning process is guaranteed.

Specific to the relative movement of the joint 42 and the spray head 43, the spray head 43 can be fixed on the housing 41, the joint 42 is movably installed on the housing 41, and the relative movement of the joint 42 and the spray head 43 is realized through the movement of the joint 42 relative to the housing 41; the joint 42 can also be fixed on the housing 41, the spray head 43 is movably installed on the housing 41, and the relative movement between the spray head 43 and the joint 42 is realized through the movement of the spray head 43 relative to the housing 41; of course, it is also possible that both the spray head 43 and the joint 42 are movably installed on the housing 41, relative movement of the spray head 43 and the joint 42 is achieved by movement of the housing 41 relative to each other.

Further, the cleaning and sealing assembly 40 further comprises: an elastic member positioned in the housing 41 and used for enabling the joint 42 to be communicated with the spray head 43 when the housing 41 opens the material discharging port 12, as shown in FIGS. 4 and 6.

The elastic member is provided in the housing 41, when the housing 41 closes the material discharging port 12, the elastic member elastically deforms to store elastic potential energy, and at the moment, the cleaning inlet pipe 30 and the cleaning cavity 10 respectively exert acting force on the joint 42 and the housing 41, so that the joint 42 and the spray head 43 are able to be separated to close the spray head 43, as shown in FIG. 4; when the housing 41 opens the material discharging port 12, the acting force exerted by the cleaning cavity 10 on the housing 41 disappears, the elastic member releases elastic potential energy to restore deformation, so that the joint 42 abuts against the spray head 43, the joint 42 is communicated with the spray head 43, the spray head 43 is opened, as shown in FIG. 6, meanwhile, the joint 42 is disconnected from the interior of the cleaning cavity 10, water output by the cleaning inlet pipe 30 enters the cooking cavity through the spray head 43 in the form of atomized mist, and bubble breaking and overflow prevention are carried out. Therefore, the automatic opening of the spray head 43 is realized by arranging the elastic member in the housing 41, sealing and anti-overflow functions are achieved, the structure of the product is simplified, and the design is ingenious. In one embodiment, the elastic member is a spring 44, as shown in FIGS. 3 to 6, which is good in elasticity, large in deformation and low in cost.

Of course, the elastic member can be other elastic structures such as elastic sheets and the like, and is not listed again here; the elastic member is not provided in the housing 41, but the relative movement of the joint 42 and the spray head 43 can be realized through other structures, so that the connection or disconnection of the joint 42 and the spray head 43 is able to be realized. For example, an elastic member is provided below the cleaning cavity 10 and connected to the spray head 43, and when the cleaning inlet pipe 30 moves upwards to seal the material discharging port 12, the elastic member stretches and deforms to separate the spray head 43 from the joint 42; when the cleaning inlet pipe 30 moves downwards to open the material discharging port 12, the elastic member recovers deformation or undergoes compression deformation, so that the joint 42 is communicated with the spray head 43; or other schemes, which are not In one embodiment enumerated herein, are intended to be within the scope of the present disclosure since they are capable of attaining the objects of the present disclosure without departing from the spirit and scope of the present disclosure.

Further, the joint 42 is movably installed on the housing 41, the lower end of the joint 42 is provided with a limiting boss 421, as shown in FIGS. 4 and 6, the spray head 43 is fixedly installed on the housing 41, the elastic member is sleeved on the joint 42, and the upper end and the lower end of the elastic member respectively abut against the housing 41 and the limiting boss 421 and are in a compressed state; when the cleaning inlet pipe 30 moves upwards, the housing 41 closes the material discharging port 12, as shown in FIG. 4; and when the cleaning inlet pipe 30 moves downwards, the housing 41 opens the material discharging port 12, as shown in FIG. 6.

The joint 42 is movably provided on the housing 41, so that the joint 42 is able to move relative to the housing 41, and relative movement between the joint 42 and the spray head 43 is able to be guaranteed; the lower end of the joint 42 is provided with a limiting boss 421, so that the joint 42 is able to not fall out of the housing 41; the elastic member is sleeved on the joint 42, and the upper end and the lower end of the elastic member respectively abut against the housing 41 and the limiting boss 421, so that the elastic member is able to not fall off, the deformation direction of the elastic member is consistent with the movement direction of the joint 42, and the use reliability of the elastic member is improved; the elastic member is in a compressed state, so that when the housing 41 opens the material discharging port 12, the elastic member is able to exert downward acting force on the joint 42, and because the spray head 43 is fixedly installed on the housing 41, the elastic member is able to tightly abut against the joint 42 on the spray head 43 to realize communication between the spray head 43 and the joint 42; when the cleaning inlet pipe 30 moves upwards, the housing 41 closes the material discharging port 12, so that the cleaning cavity 10 and the cleaning inlet pipe 30 are able to respectively exert downward and upward acting forces on the housing 41 and the joint 42, the housing 41 and the joint 42 are able to exert extrusion acting forces on the elastic member, the elastic member is further compressed and deformed, meanwhile, the joint 42 is separated from the spray head 43, the spray head 43 is closed, and the cleaning cavity 10 is communicated, as shown in FIGS. 3 and 4; when the cleaning inlet pipe 30 moves downwards, the housing 41 opens the material discharging port 12, so that the acting force exerted by the cleaning cavity 10 on the housing 41 disappears, the elastic member recovers deformation and presses the housing 41 upwards, the housing 41 drives the spray head 43 to move upwards relative to the joint 42, and the joint 42 tightly abuts against the spray head 43 to open the spray head 43 and communicate with the cooking cavity, as shown in FIGS. 5 and 6.

Further, as shown in FIGS. 4 and 6, the housing 41 comprises: an upper cover on which the joint 42 is provided, and the transport hole 4121 is provided on the upper cover; a bottom cover 413 connected to the lower end of the upper cover, and the spray head 43 is installed on the bottom cover 413 and penetrates through the bottom cover 413; the shape of the upper cover and/or the bottom cover 413 is adapted to the material discharging port 12.

The housing 41 comprises an upper cover and a bottom cover 413, the joint 42 and the spray head 43 are respectively provided on the upper cover and the bottom cover 413, the upper cover is provided with a transport hole 4121, and the transport hole 4121 is located at the upper part of the housing 41 to ensure that the transport hole 4121 is located inside the cleaning cavity 10 and is communicated with the inner space of the cleaning cavity 10; the spray head 43 penetrates through the bottom cover 413, so that a water spraying port of the spray head 43 is able to be communicated with the cooking chamber, and atomized mist is sprayed into the cooking chamber; the housing 41 is composed of two parts, so that the joint 42, the elastic member and the spray head 43 are convenient to maintain and assemble and disassemble; and the shapes of the upper cover or the bottom cover 413 or the upper cover and the bottom cover 413 are matched with the material discharging port 12, so that the housing 41 is able to effectively seal the material discharging port 12.

In one embodiment, the upper cover comprises: a top cover 411 and a sealing cover 412, as shown in FIGS. 4 and 6. The top cover 411 is installed with the joint 42, the lower end face of the top cover 411 is provided with a first annular plate 4111 sleeved outside the joint 42 and has a gap with the joint 42 and is connected to the bottom cover 413, and the first annular plate 4111 is provided with a communication hole 4112, as shown in FIG. 4; and a sealing cover 412 sleeved outside of the first annular plate 4111 and positioned between the lower end face of the top cover 411 and the upper end face of the bottom cover 413 and matched with the shape of the material discharging port 12, as shown in FIGS. 3 and 4, and the sealing cover 412 is an elastomer, the sealing cover 412 is provided with the transport hole 4121, and the transport hole 4121 is communicated with the communication hole 4112, as shown in FIGS. 4 and 6.

The upper cover comprises a top cover 411 and a sealing cover 412, the joint 42 is provided on the top cover 411, and the cleaning and sealing assembly 40 is connected to the cleaning inlet pipe 30; the lower end face of the top cover 411 is provided with a first annular plate 4111, the first annular plate 4111 is sleeved outside the joint 42, a gap is formed between the first annular plate 4111 and the joint 42, a communication hole 4112 is formed in the first annular plate 4111, and when the joint 42 is isolated from the spray head 43, an internal channel of the joint 42 is communicated with the communication hole 4112 through the gap between the first annular plate 4111 and the joint 42; the sealing cover 412 is sleeved on the outside of the first annular plate 4111 and positioned between the lower end face of the top cover 411 and the upper end face of the bottom cover 413, and the sealing cover 412 is an elastomer, so that the lower end face of the top cover 411 and the upper end face of the bottom cover 413 are able to exert a vertical squeezing force and a certain horizontal static friction force on the sealing cover 412 to limit the vertical movement and the horizontal movement of the sealing cover 412, and the first annular plate 4111 ensures that the sealing cover 412 does not horizontally fall out, so that integrity of the housing 41 is guaranteed; meanwhile, the sealing cover 412 is matched with the shape of the material discharging port 12, namely the material discharging port 12 is enclosed by the sealing cover 412, due to the fact that the sealing cover 412 is an elastomer, certain elastic deformation is able to occur when the material discharging port 12 is enclosed by the sealing cover 412, the sealing cover 412 is tightly attached to the material discharging port 12, an effective sealing effect is achieved, sealing members such as sealing rings and the like do not need to be provided between the housing 41 and the material discharging port 12 to improve the sealing performance of the material discharging port 12, and therefore the structure of the material cleaning device is simplified; in addition, compared with the rigid body, the processing and molding of the elastomer are easier, so that the transport holes 4121 are formed in the sealing cover 412, and the processing technology of the product is simplified; and the transport hole 4121 is communicated with the communication hole 4112, so that when the joint 42 is isolated from the spray head 43, the air flow and the water flow output by the joint 42 enter the transport hole 4121 through the communication hole 4112 and then are transported into the cleaning cavity 10.

In one embodiment, the sealing cover 412 is a silica gel cover, and the silica gel not only has certain rigidity so that the sealing cover 412 is able to keep a fixed shape, but also has certain elasticity so that the sealing cover 412 is able to generate a proper amount of elastic deformation to meet the assembly requirement and the sealing requirement.

Further, the upper end face of the bottom cover 413 is provided with a second annular plate 4131, the second annular plate 4131 is connected to the first annular plate 4111, and the bottom cover 413 is connected to the top cover 411, as shown in FIGS. 4 and 6; and a third annular plate 4122 is provided in the sealing cover 412, the third annular plate 4122 is sleeved outside the second annular plate 4131 and is attached to the outer surface of the second annular plate 4131, as shown in FIGS. 4 and 6, and the transport hole 4121 is positioned above the third annular plate 4122.

The upper end face of the bottom cover 413 is provided with a second annular plate 4131, and the second annular plate 4131 is connected to the first annular plate 4111 (such as threaded connection, clamping connection and the like), so that the bottom cover 413 and the top cover 411 are fixedly connected; a third annular plate 4122 is provided in the sealing cover 412, the third annular plate 4122 is sleeved outside the second annular plate 4131 and is attached to the outer surface of the second annular plate 4131, so that the second annular plate 4131 effectively limits the sealing cover 412, the sealing cover 412 is prevented from moving in the radial direction, the upper limit and the lower limit are carried out on the lower end surface of the top cover 411 and the upper end surface of the bottom cover 413, and the second annular plate 4131 horizontally limits the sealing cover 412 (when the housing 41 is circular, static friction force exerted by the top cover 411, the bottom cover 413 and the second annular plate 4131 on the sealing cover 412 is able to also limit the circumferential rotation of the sealing cover 412), so that the use reliability of the sealing cover 412 is guaranteed; and the transport hole 4121 is positioned above the third annular plate 4122, so that the third annular plate 4122 is prevented from shielding the transport hole 4121, and the communication between the transport hole 4121 and the communication hole 4112 is further ensured.

In one embodiment, a limiting surface 4123 is further provided in the sealing cover 412, and the upper end surface of the second annular plate 4131 abuts against the limiting surface 4123, as shown in FIG. 4.

The limiting surface 4123 is provided in the sealing cover 412, the upper end surface of the second annular plate 4131 abuts against the limiting surface 4123, the limiting surface 4123 is able to be tightly attached to the upper end surface of the second annular plate 4131 (since the sealing cover 412 is an elastic body), thus a good sealing effect is achieved, so that water flow or air flow output by the circulation hole is able to be prevented from leaking out between the second annular plate 4131 and the third annular plate 4122, and the sealing property inside the cleaning and sealing assembly 40 is effectively improved. Furthermore, the second annular plate 4131 and the third annular plate 4122 can be designed to be in clearance fit to facilitate assembling and disassembling; meanwhile, the second annular plate 4131 and the sealing cover 412 are mutually limited, and the stability of the housing 41 is further improved.

Further, the material cleaning device further comprises: a sealing member installed on the bottom cover 413 and sleeved at the inlet of the spray head 43, as shown in FIGS. 4 and 6.

When the sealing member is provided at the inlet of the spray head 43, the joint 42 and the spray head 43 are able to be tightly pressed on the sealing member when the joint 42 and the spray head 43 are communicated in pairs, so that the sealing property between the spray head 43 and the joint 42 is improved when the spray head 43 and the joint 42 are communicated, the water flow is ensured to enter the spray head 43 with enough pressure, and the spray bubble breaking efficiency of the spray head 43 is improved. In one embodiment, the sealing member is a sealing rubber gasket 45.

Figure 7:
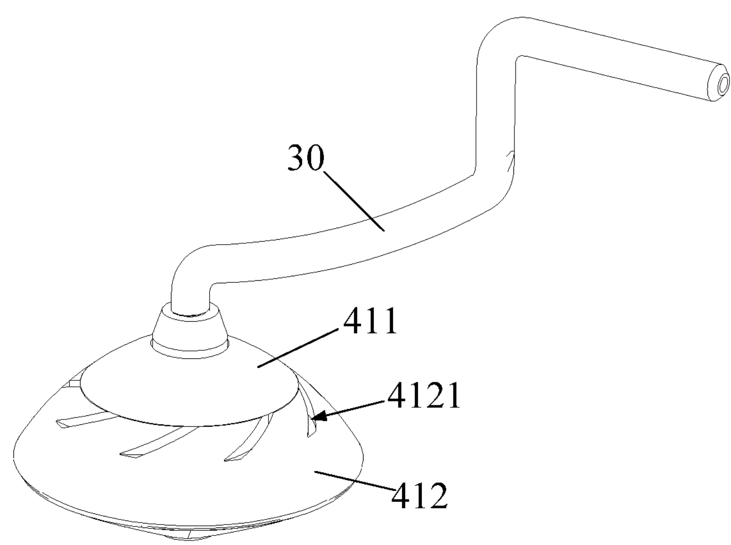
FIG. 7 is a schematic view illustrating an assembly structure of a cleaning inlet pipe and a cleaning and sealing assembly according to some embodiments of the present disclosure.

In any one of the embodiments, there are multiple transport holes 4121, and the transport holes 4121 are uniformly distributed along the circumferential direction of the housing 41, as shown in FIG. 7.

There are multiple transport holes 4121, so that the efficiency of transporting airflow and water flow for cleaning the sealing assembly 40 is improved; transport holes 4121 are uniformly distributed along the circumferential direction of the housing 41, on one hand, the uniformity of airflow output is improved, and materials in the cleaning cavity 10 are able to be uniformly stirred, so that the cleaning efficiency is improved; on the other hand, the integral stress of the housing 41 is balanced, and the stability of the cleaning and sealing assembly 40 is improved.

In one embodiment, the upper part of the housing 41 is a rotating body, and the cross sectional area of the rotating body is gradually increased from top to bottom, the transport holes 4121 are provided in the rotating body, and the transport holes 4121 are formed in a strip shape integrally and extend obliquely along the wall surface of the rotating body in a rotating manner, as shown in FIG. 7.

The upper part of the housing 41 is a rotating body, the cross-sectional area of the rotating body gradually changes from top to bottom, the upper part of the housing 41 is integrally conical or bowl-shaped, the transport holes 4121 are provided at the rotating body and are integrally elongated, and the transport holes 4121 extend obliquely along the wall surface of the rotating body in a rotating mode, so that on one hand, water flow and air flow are able to be sprayed out in a rotating mode. Although the transport holes 4121 are separated from each other, the air flows transported by the different transport holes 4121 are able to be integrated, the coverage range is wider, materials in a circumferential range are able to be stirred by using a limited number of transporting holes, no dead angle of 360° is able to be realized, and therefore the cleaning efficiency is improved; on the other hand, when the airflow is sprayed out, the airflow also has a certain horizontal component speed, so that materials and water are able to be driven to rotate, and the cleaning efficiency is also improved; in addition, the size of the transport holes 4121 is able to be remarkably increased, so that the air transporting efficiency and the water transporting efficiency are improved, and the number of the transport holes 4121 is reduced (for example, possibly only one row of transport holes 4121 is required to meet the requirement); meanwhile, the appearance is more attractive. Further, for the embodiment that the upper cover comprises the top cover 411 and the sealing cover 412, the transport hole 4121 is provided at the sealing cover 412 and extends upwards to penetrate through the upper end face of the sealing cover 412.

In one embodiment, the transport hole 4121 is provided at the upper part of the housing 41, and the cross sectional area of the upper part of the housing 41 is gradually increased from top to bottom, as shown in FIG. 7.

The transport hole 4121 is provided at the upper part of the housing 41, so that effective communication between the transport hole 4121 and the cleaning cavity 10 is guaranteed; the cross sectional area of the upper part of the housing 41 is gradually increased from top to bottom, and the transport holes 4121 are inclined upwards, so that the airflow is able to be obliquely sprayed upwards, the tumbling of materials and water is facilitated, the pneumatic stirring efficiency is improved, and the cleaning efficiency is improved.

According to any one of the embodiments, as shown in FIGS. 3 and 5, the material cleaning device further comprises: a driving device 50 comprising a driving member and a transmission assembly connected to the driving member, and the transmission assembly is connected to the cleaning inlet pipe 30 to drive the cleaning inlet pipe 30 to move up and down, and the cleaning inlet pipe 30 drives the cleaning and sealing assembly 40 to move up and down.

Further, the material cleaning device further comprises: a limiting member 54, as shown in FIGS. 3 and 5, matched with the transmission assembly and used for limiting the movement amplitude of the transmission assembly.

Further, the transmission assembly comprises: a gear 52 connected to the output shaft of the driving member; and a rack slider 53 meshed with the gear 52 and connected to the cleaning inlet pipe 30 and extending in the vertical direction to drive the cleaning inlet pipe 30 to move up and down, as shown in FIG. 3; and the limiting member 54 is positioned above the rack slider 53 to limit the amplitude of upward movement of the rack slider 53.

The cleaning inlet pipe 30 is driven to move up and down by the driving device 50, so that the automation degree of products is further improved; when the driving device 50 drives the cleaning inlet pipe 30 to move up and down, the cleaning inlet pipe 30 drives the cleaning and sealing assembly 40 to move up and down, and then the material discharging port 12 is opened or closed; and the limiting member 54 is matched with the transmission assembly, so that the cleaning inlet pipe 30 is able to be prevented from excessively moving up and down to damage the product structure or other adverse effects (such as excessive upward movement of the cleaning inlet pipe 30 results in frictional wear and even deformation of the cleaning and sealing assembly 40 and the cleaning cavity 10).

In one embodiment, the driving device 50 comprises a driving member and a transmission assembly, and the transmission assembly comprises a gear 52 and a rack slider 53, the gear 52 is connected to an output shaft of the driving member (such as a motor 51) and rotates along with the rotation of the shaft of the motor 51, the rack slider 53 is meshed with the gear 52 and extends in the vertical direction, and when the gear 52 rotates, the rack slider 53 is driven to move up and down in the vertical direction, so that the cleaning inlet pipe 30 moves up and down; and the limiting member 54 is positioned above the rack slider 53, so that the upward movement amplitude of the rack slider 53 is able to be limited, and the situation that excessive upward movement of the cleaning inlet pipe 30 results in frictional wear and even deformation of the cleaning and sealing assembly 40 and the cleaning cavity 10 is avoided. Of course, the drive assembly is not limited to a gear 52-rack slider 53 configuration but other forms, which will not be enumerated here.

One embodiment of the present disclosure provides a cooking appliance, comprising: a cooking body having a cooking chamber; and the material cleaning device of any of the first aspect technical scheme, and a material discharging port 12 of the cleaning cavity 10 communicates with the cooking chamber for cleaning the material fed into the cleaning cavity 10 and feeding the cleaned material into the cooking chamber.

In the above embodiments, the cooking body comprises: a pot body 200 and a cover body 100, and the cover body 100 is covered with the pot body 200 to enclose the cooking chamber; and the material cleaning device is provided on the cover body 100.

The material cleaning device is provided on the cover body 100 and is convenient to communicate with the cooking chamber when the material discharging port 12 of the cleaning cavity 10 is opened, so that materials in the cleaning cavity 10 are able to smoothly enter the cooking chamber for cooking, and the structure is more compact and reasonable.

In one embodiment, the cleaning cavity 10 of the material cleaning device and the cover body 100 of the cooking appliance are all integrated structures, so that the assembling efficiency of the product is able to be improved, the assembling matching precision and the sealing connection reliability of the air inlet pipe 61, the air outlet pipeline, the water inlet pipeline, the sewage pipeline and the cleaning cavity 10 are able to be further guaranteed, and the using reliability of the product is able to be guaranteed.

In any of the above embodiments, the cooking appliance is an electric cooker.

Of course, it is not limited to an electric cooker, but may also be an electric pressure cooker, an electric stewpot, an electric steamer, etc.

The working principle of the material cleaning device and the cooking appliance provided by the application is described below by taking the full-automatic electric rice cooker as an example.

The full-automatic rice cooker is provided with a cover body 100, the cover body 100 is provided above the inner cooker, and a rice cleaning box (i.e. a cleaning cavity 10) is installed on the inner cover of the cover body 100; the rice cleaning box is provided with an air inlet and a material feeding port, the material feeding port is connected to a rice inlet pipe (i.e. the material transport pipe 20) of the cover body 100, and the air inlet is connected to the cover body fan 60 through an air blowing pipe (i.e. the air inlet pipe 61) of the cover body 100; the cover body 100 is also provided with a three-way joint 31, a water inlet of the three-way joint 31 is connected to a water inlet pipeline of the machine body through a hose, an air inlet is connected to an air pump of the machine body, and an outlet of the three-way joint 31 is connected to a water inlet pipe (i.e. a cleaning inlet pipe 30) through a connecting hose 32; a rice cleaner (i.e. a cleaning and sealing assembly 40) is connected to the bottom of the water inlet and air inlet pipe, and the rice cleaner is provided with a rice cleaner cover body 100 (i.e. a top cover 411), a rice cleaner lower cover (i.e. a bottom cover 413), a joint 42 (i.e. a joint 42), a spring 44, a spray head 43, a spray head 43 sealant (i.e. a sealing rubber gasket 45) and a rice cleaner sealant (i.e. a sealing cover 412); the joint 42 is able to move up and down, and the rice cleaner sealant is provided with a through hole (i.e. a transport hole 4121) for realizing water inlet and air blowing.

The rice cleaning box is also provided with a motor 51, a gear 52 and a slider (i.e. a rack slider 53), and the slider is provided with a rack part, the motor 51 drives the gear 52 to rotate, and the gear 52 rotates to drive the rack to move up and down to realize the position of a rice cleaner for cleaning rice and discharging rice; in addition, the upper end of the slider is provided with a fixed block (i.e. a limiting member 54) for achieving the upper limit of the upward movement of the slider, and the bottom of the downward movement of the slider meets the bottom plastic to achieve the lower limit.

The specific working principle of the rice cleaning box is as follows:

When cleaning rice, a motor 51 rotates forwards to drive a gear 52, the gear 52 drives a rack to move upwards, the rice cleaner is in a first position, as shown in FIG. 3, a water inlet pipe pulls a joint 42 to compress a spring 44 upwards, the joint 42 is far away from spray silica gel, communication between the water inlet pipe and a through hole of the rice cleaner is realized, as shown in FIG. 4, after rice enters a rice cleaning box from a material feeding port, a proper amount of water is first injected into the water inlet pipe; and then air is blown in through an air pump, air bubbles are formed at the water-rice mixture to tumble, and the water left after cleaning rice is pumped out by a water pump, so that the rice cleaning process is realized, and the rice cleaning process is able to be carried out one or more times.

After rice is cleaned, the motor 51 reverses to drive the gear 52, the gear 52 drives the rack to move downwards, the rice cleaner is in the second position, as shown in FIG. 5, the spring 44 pushes the joint 42 to press the spray silica gel, the water inlet and air inlet pipe is communicated with the spray head 43, as shown in FIG. 6, high-speed air is blown in from the air inlet of the rice cleaning box, and the cleaned rice is transported into the inner pot through spiral sinking of the high-speed air.

When rice is being cooked water mist is able to be sprayed out through the spray head 43 to break bubbles and prevent overflowing, as shown in FIG. 5.

In summary, according to the material cleaning device provided by the present disclosure, the cleaning cavity is provided with a material feeding port, an air inlet and a material discharging port; the material feeding port is connected to a material transport pipe, so that materials are able to be automatically fed into the cleaning cavity, and automatic feeding is realized; the air inlet is able to be connected to an air source (such as an air pump, a fan and the like), so that materials are able to be discharged from the material discharging port with the air flow and gravity, and automatic material discharging is realized; a cleaning and sealing assembly is provided at the material discharging port, the cleaning and sealing assembly is communicated with a cleaning inlet pipe, the cleaning inlet pipe is connected to an air source and a water source through a three-way joint to transport air flow and water flow to a cleaning cavity; the water flow is used for cleaning materials, the air flow is used for promoting the materials and the water to roll, rub, rotate and the like, so that the cleaning of the materials is realized, namely the effect of blowing air to clean rice is realized by utilizing air flow stirring, and the air flow stirring is compared with mechanical stirring; the structure is simpler, and cleaning is more sanitary; the cleaning and sealing assembly also has the function of a discharge valve to open or close the material discharging port, so that the integration level of the product is improved, the volume of the product is reduced, and the structure of the product is simplified; in addition, the material feeding port and the air inlet are separated from each other as compared with the scheme of combining them into one, on the basis that the pneumatic material discharging function is achieved, the selection range of the material feeding power sources (for example: besides pneumatic feeding, automatic feeding can be realized by gravity, water power or other external force) is increased, and the position selection range of the air source connected to the air inlet (for example: taking the electric rice cooker as an example, the electric rice cooker can be positioned not only in the cooker body but also in the cooker cover) is also expanded, to facilitate reasonable design according to the specific structures and market positioning of different products, to further optimize the performance and structure of the cooking appliance.

In the present disclosure, the terms "first", "second", "third" are used for descriptive purposes only and are not to be construed as indicating or implying relative importance; the term "plurality" refers to two or more, unless explicitly defined otherwise. The terms "installed, connected, connected to, fixed", and the like are to be construed broadly, e.g., "connected" may be a fixed connection, a removable connection, or an integral connection; "connected to" may be directly connected or indirectly connected through an intermediary.

In describing the present disclosure, it is to be understood that the terms "upper, lower, left, right, front, rear", and the like indicate orientations or positional relationships that are based on the orientations or positional relationships shown in the drawings and are merely intended to facilitate describing the present disclosure and to simplify the description and are not intended to indicate or imply that the device or unit in question must have a particular orientation. It is not to be construed as limiting the present disclosure, as it is constructed and operated in a particular orientation.

In the description of the present specification, the terms "one embodiment", "some embodiments", "embodiments", and the like, mean that a particular feature, structure, material, or characteristic described in connection with the embodiment or example is included in at least one embodiment or example of the present disclosure. In this specification, schematic representations of the above terms do not necessarily refer to the same embodiment or example. Furthermore, the particular features, structures, materials, or characteristics described may be combined in any suitable manner in any one or more embodiments or examples.

What is claimed is:

1. A material cleaning device for a cooking appliance, comprising:

a cleaning cavity, wherein an upper part of the cleaning cavity is provided with a material feeding port and an air inlet, a bottom of the cleaning cavity is provided with a material discharging port, and the air inlet is used for transporting air flow to the cleaning cavity to assist material discharging;

a material transport pipe communicated with the material feeding port and used for transporting materials to be cleaned to the cleaning cavity;

a cleaning inlet pipe, wherein an input end of the cleaning inlet pipe is able to be connected to a water source and an air source, and an output end of the cleaning inlet pipe extends into the cleaning cavity and is able to move up and down relative to the cleaning cavity;

a cleaning assembly provided at the material discharging port and connected to the output end of the cleaning inlet pipe, and the cleaning assembly is provided with a transport hole communicated with the output end of the cleaning inlet pipe and an inner space of the cleaning cavity; and a driving device comprising a driving member and a transmission assembly connected to the driving member, and the transmission assembly is connected to the cleaning inlet pipe to drive the cleaning inlet pipe to move up and down, and the cleaning inlet pipe drives the cleaning assembly to move up and down;

wherein the cleaning assembly is configured to open or close the material discharging port under movement of the cleaning inlet pipe.

2. The material cleaning device of claim 1, wherein the cleaning assembly comprises:

a housing matched with a shape of the material discharging port, and the housing is provided with the transport hole; and a joint installed at a top of the housing and connected to the output end of the cleaning inlet pipe and communicated with the cleaning inlet pipe and the inner space of the housing.

3. The material cleaning device of claim 2, wherein the cleaning and sealing assembly further comprises:

a spray head installed at a bottom of the housing and provided opposite to the joint, wherein a water spraying port of the spray head is communicated with a cooking chamber of the cooking appliance, and the spray head is configured to move relative to the joint;

wherein when the cleaning inlet pipe moves up and down, the housing is configured to move up and down, and at the same time the joint and the spray head are driven to move relatively, wherein when the housing closes the material discharging port, the spray head is isolated from the joint, and when the housing opens the material discharging port, the spray head is communicated with the joint.

4. The material cleaning device of claim 3, wherein the cleaning assembly further comprises:

a spring positioned in the housing and configured to enable the joint to be communicated with the spray head when the housing opens the material discharging port.

5. The material cleaning device of claim 4, wherein the joint being movably installed on the housing, a limiting boss being provided at a lower end of the joint, the spray head being fixedly installed on the housing, the spring being sleeved on the joint, and an upper end and a lower end of the spring respectively abutting against the housing and the limiting boss and being in a compression state;

wherein, when the cleaning inlet pipe moves upwards, the housing closes the material discharging port; and when the cleaning inlet pipe moves downwards, the housing opens the material discharging port.

6. The material cleaning device of claim 5, wherein the housing comprises:

a top cover, wherein the joint is provided on the top cover on which the transport hole is provided;

a bottom cover connected to a lower end of the top cover, wherein the spray head is installed on the bottom cover and penetrates through the bottom cover;

a shape of the top cover and/or the bottom cover corresponds with a shape of the material discharging port.

7. The material cleaning device of claim 6, wherein the top cover is provided with the joint, a lower end surface of the top cover is provided with a first annular plate sleeved outside the joint and has a gap with the joint and is connected to the bottom cover, and the first annular plate is provided with a communication hole; and wherein the top cover comprises a sealing cover sleeved outside of the first annular plate and positioned between the lower end surface of the top cover and an upper end surface of the bottom cover and matched with a shape of the material discharging port, wherein the sealing cover is an elastomer, the sealing cover is provided with the transport hole, and the transport hole is communicated with the communication hole.

8. The material cleaning device of claim 7, wherein the upper end surface of the bottom cover being provided with a second annular plate, the second annular plate being connected to the first annular plate, and the bottom cover being connected to the top cover; wherein a third annular plate is provided in the sealing cover, the third annular plate is sleeved outside the second annular plate and is attached to an outer surface of the second annular plate, and the transport hole is positioned above the third annular plate.

9. The material cleaning device of claim 8, wherein a limiting surface being further provided in the sealing cover, and an upper end surface of the second annular plate abutting against the limiting surface.

10. The material cleaning device according to claim 6, further comprising:

a sealing member installed on the bottom cover and sleeved at an inlet of the spray head.

11. The material cleaning device of claim 2, further comprising:

a plurality of transport holes, and the plurality of transport holes being uniformly distributed along a circumferential direction of the housing; and the plurality of transport holes are formed in an upper part of the housing, and a cross sectional area of the upper part of the housing becomes larger from top to bottom; and the upper part of the housing is a rotating body, and the cross sectional area of the rotating body changes from top to bottom, the plurality of transport holes are formed in the rotating body, the plurality of transport holes are in a strip shape integrally and rotating along a wall surface of the rotating body and extend obliquely.

12. The material cleaning device of claim 1, further comprising:

a limiting member matched with the transmission assembly and used for limiting movement amplitude of the transmission assembly.

13. The material cleaning device of claim 12, wherein the transmission assembly comprises:

a gear connected to an output shaft of the driving member; and a rack slider meshed with the gear and connected to the cleaning inlet pipe and extending in a vertical direction to drive the cleaning inlet pipe to move up and down;

wherein the limiting member is positioned above the rack slider so as to limit amplitude of upward movement of the rack slider.

* * * * *